US006253255B1

(12) United States Patent
Hyder et al.

(10) Patent No.: US 6,253,255 B1
(45) Date of Patent: Jun. 26, 2001

(54) SYSTEM AND METHOD FOR BATCHING DATA BETWEEN TRANSPORT AND LINK LAYERS IN A PROTOCOL STACK

(75) Inventors: Jameel Hyder, Redmond; Kyle Brandon, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/853,847

(22) Filed: May 8, 1997

(51) Int. Cl.⁷ ....................................... G06F 9/00
(52) U.S. Cl. ........................ 709/321; 709/231; 709/250
(58) Field of Search ........................ 395/200.33, 200.53, 395/200.66, 849; 370/235, 457, 392; 709/246, 101, 300, 321, 322, 327, 328, 231, 232, 236, 250; 710/33, 34, 35; 705/101

(56) References Cited

U.S. PATENT DOCUMENTS

| | | | |
|---|---|---|---|
| 5,115,392 | * 5/1992 | Takamoto et al. | 709/101 |
| 5,691,985 | * 11/1997 | Lorenz et al. | 370/401 |
| 5,740,467 | * 4/1998 | Chmielecki, Jr. et al. | 710/56 |
| 5,797,043 | * 8/1998 | Lewis et al. | 395/876 |
| 5,805,920 | * 9/1998 | Sprenkle et al. | 395/821 |
| 5,809,501 | * 9/1998 | Noven | 707/7 |
| 6,052,744 | * 4/2000 | Moriarty et al. | 710/27 |

OTHER PUBLICATIONS

Michael W. Garwood, et al, *Unix Streams: If Modularity and Portability Are Part of Your Unix Problems*, Dr. Dobb's Journal of Software Tools, vol. 14; No. 1; p. 50 (Jan. 1989).
Brian Ramsey, *Streamlining Protocols for Networks*, Electronic Engineering Times, Embedded Systems, p. 80, part 3 networks (Jun. 5, 1995).
Tom Williams, *Unix–Style Communications for Embedded Systems; Metaspher's Embedded Streams Software; Product Announcement*, Computer Design, vol. 31; No. 10; p. 140 (Oct. 1992).
Michael Day, *Unix Breakthroughs Create LAN Products*, LAN Times, vol. 8; No. 3; p. 69 (Feb. 4, 1991).
Jim Carr, for Unix Users: *NSF and RFS Provide File Access Across Networks; Unix Local Area Networks; Network File System, Remote File Sharing; Includes Related Article on Sun's Guide to Who Is Selling OCN/NFS*, The Local Area Network Magazine, vol. 5; No. 2; p. 76 (Feb. 1990).
Eric Hindin, *Unix System V Version with Interface Between Applications and Networks Has Users Talking; Computer Network Protocols; Connectivity*, PC Week, vol. 4; p. C11 (Jan. 27, 1987).
Davidson, Introduction to TCP/IP, Springer–Verlag ISBN 0–387–96651–X, pp. 15, 17, 51, 52, 54, 1988.*

* cited by examiner

Primary Examiner—Dung C. Dinh
(74) Attorney, Agent, or Firm—Workman, Nydegger & Seeley

(57) ABSTRACT

A system and method for transferring a plurality of data packets between a transport layer and a link layer is presented. The system and method provide a standardized development interface for development of transport and link layer drivers across multiple platforms. The abstract interface provides a standardized functional module through which multiple packet transfer commands are received and passed. The abstract interface discerns the level of sophistication of interfacing drivers and when drivers lack the capability for transferring multiple packets in a single command, the abstract interface emulates multiple transfer capabilities for such drivers.

21 Claims, 6 Drawing Sheets

SYSTEM AND METHOD FOR BATCHING DATA BETWEEN TRANSPORT AND LINK LAYERS IN A PROTOCOL STACK

BACKGROUND OF THE INVENTION

1. The Field of the Invention

The present invention relates to systems and methods for transferring data between a transport layer and a link layer in a computer system. More specifically, the present invention relates to systems and methods for transmitting bulk data partitioned into a plurality of packets between a transport layer and a link layer using a singular command therebetween.

2. The Relevant Technology

Today, computers are becoming a main staple for information exchange in the modern society. Computers, namely personal computers (PC), provide the source and termination points for a majority of information exchange. A user at a PC may input information and quickly transmit such information to another user at a destination computer in a fraction of a second. The logistics of such transfers originated from simple origins such as directly coupled or connected computers. However, today, computers are not directly coupled in a one-to-one corresponding configuration, but frequently exist in a network environment wherein multiple computers are interconnected one with another.

In computer networks wherein interconnections are not dedicated and isolated, information or data targeted for one computer must be addressed for receipt by a designated computer. Furthermore, information traveling from a source computer to a destination computer, in most networks, travels over a shared network link. To facilitate the transfer and management of significant amounts of data across communication or computer networks, the partitioning of data into useable packets has become necessary to facilitate multiusers on a shared network resource.

In addition to partitioning data into smaller components or packets, network transfer software facilitating the exchange of data between computers has also been partitioned into identifiable components. Standardized components or structures conforming to the OSI protocol model have been promulgated for many years. Although many systems do not incorporate each and every level of the OSI standardized model, the majority of network systems incorporate fundamental components of the OSI model. For example, the transport layer of the OSI model facilitates the aforementioned partitioning or packetizing of bulk data into useable, convenient packet formats for dispatching throughout the computer network. Some transport layers have become preeminently dominant in the computer networking arena. For example, TCP/IP, although taking on minor and major variations, has become a standard transport protocol for use in implementing the transport layer of the OSI model for computer networking. Additionally, IPX and NetBEUI have also become standard transport protocols in computer networks. Such transport protocols are implemented in an OS or network protocol stack by programming a transport protocol driver capable of receiving bulk data and transforming such bulk data into packetized and formatted data capable of efficient propagation through a computer network.

FIG. 1 represents a prior art configuration of a network protocol stack or configuration 100 capable of transporting bulk data 102 between a computer and network 164. As described above, transport layer or driver 104 receives bulk data 102 and partitions bulk data 102 into packets properly sized and formatted for propagation in network 164. In FIG. 1, transport driver 104 partitions bulk data 102 into packets 106, 108 and 110 and applies formats accordingly. Generally, rather than directly transporting or forwarding data through subsequent layers or levels, pointers to the data packets are generated. Pointer 112, 114 and 116, provide accessibility to the packetized data and are individually passed to other layers as opposed to replicating or copying entire data packets upon issuance of a transfer command.

As described above, a transport driver interfaces with other software components supporting the functionality of other OSI layers. To facilitate the compatibility of various layers, an interface 120 defines a neutral specification for the development of operative layers or drivers. Transport driver 104 incorporates an interface 118 compliant with interface 120 through which packetized information may be exchanged.

A link layer device driver 124 provides link layer functionality which generally comprises preparing and presenting data in a particular form and location in preparation for transmission and reception by hardware such as physical device 130 interfaced to network 164. Similar to transport driver 104, link layer device driver 124 provides a compatible interface 128 for compliant communication therebetween.

Communication flow of bulk data 102 to network 164 will now be discussed. Transport layer 104 receives bulk data 102 from yet a higher layer in the OSI module, typically an application layer. As discussed above, transmission of bulk data 102 in raw format across network 164 is prohibitive due to several factors such as (i) interference noise present in network 164 which destroys or degrades a portion of bulk data 102, thus requiring a retransmission of the entire bulk data, (ii) the shared nature of network 164 with other computers requiring time-multiplexing, and (iii) other practicalities of successful transmission of a substantial amount of data in a single transmit session. In a modern system, bulk data 102 is partitioned into, among others, data packet 106 having a pointer 112. Transport driver 104 dispatches a send packet request 122 comprised of pointer 112 transmitted via interface 120 through send packet request 126 to link layer device driver 124. Link layer device driver 124 then issues a request 132 to physical device 130 thereby notifying physical device 130 of the presence of data packet 106 for dispatch through network 164.

Traditional network protocol stacks typically employ dedicated buffers within system resources such as RAM that are accessible both to a computer microprocessor and physical device 130. In such configurations, link layer device driver 124 upon receiving pointer 112 may copy data packet 106 into the predefined buffer known and accessible to physical device 130.

Physical device 130, upon receipt of request 132, performs an autonomous transfer of data packet 106 into network 164. Physical device 130 generally is comprised of embedded control facilitating the extraction of data packets from common memory resources. Physical device 130 in a response 134 notifies link layer device driver 124 of the completion of the transfer of data packet 106 to network 164. Response 134, although depicted as a direct communication with link layer device driver 124 is commonly carried out with physical device 130 initiating an interrupt through the microprocessor of the computer system followed by the servicing of an interrupt service routine directed to link layer device driver 124. Link layer device driver 124 issues a send packet response 136 to interface 120 which in turn reissues or simply forwards send packet response 138 to transport driver 104. The transformation of send packet response 136 to send packet response 138 depends upon the level of functionality of interface 120.

Upon receipt of send packet response 138, transport driver 104 then initiates the transfer of packet 108 and packet 110 in sequential order by employing the processes utilized by packet 106 such as initiation of send packet requests 140 and 152, and receipt of send packet response 150 and 162. It should be noted that packets individually traverse the network protocol stack before the initiation of a subsequent traversal by a subsequent data packet. Furthermore, the successful transfer of a data packet by physical device 130 to network 164 results in a specific acknowledgement or response for each packet transferred. As discussed earlier, such responses typically take the form of an interrupt to the microprocessor which causes the microprocessor to postpone its present operations in favor of servicing an individual response. It should be evident that as bulk data 102 increases in size and the number of data packets increases, the delivery of sizeable bulk data results in a significant impairment of microprocessor performance. Furthermore, modern communication networks facilitating the transfer of high bandwidth data, such as imaging data, are required to devote a significant amount of microprocessor resources to the manipulation of such data. When undesirable intermittent interruptions become pervasive, performance degrades to undesirable or intolerable levels.

It would represent an advancement over the prior art to provide a method and system for sending a plurality of data packets from a transport driver to a link layer device driver without transmitting an individual command for each data packet. It would, therefore, represent an advancement in the art to provide the ability to minimize the quantity of interruptions to the microprocessor during the transmission of bulk data to a network. It would also represent an advancement in the art to minimize the amount of handshaking carried out between layers within the OSI stack. It would yet represent an advancement in the art to provide a method and system for receiving a plurality of data packets from a network and forwarding the plurality of data packets to a transport driver without being required to issue individual transfer commands for each packet.

SUMMARY AND OBJECTS OF THE INVENTION

The foregoing problems in the prior state of the art have been successfully overcome by the present invention, which is directed to a system and method for transferring a plurality of data packets between a transport layer and a link layer device driver in a computer operating system. The current system and method can be used in virtually any computer network system. The present invention comprises both methods and systems for batching or transferring a plurality of data packets between a transport layer and a link layer in a network protocol stack of a computer system.

In the present invention, a network protocol stack comprised of a transport driver receives bulk data to transfer to a network. The transport driver, in order to facilitate orderly transfer of data through the network, packetizes and formats the bulk data into data packets. The transport driver contains a level of functionality for initiating a multi-packet transfer by generating a request including an array of pointers to the data packets. A pointer to the array of pointers is also included within the multi-packet transfer request. Additionally, a quantity of data packets indicator is included within the request and, alternatively, when a plurality of destination drivers exist, a handle or device descriptor accompanies the multi-packet request.

The transport layer subsequently issues a multi-packet or send packets request to the abstract interface which in turn evaluates the device driver handle or descriptor as specified by transport driver to determine the capabilities or sophistication of the destination link layer device driver. If the abstract interface determines that the link layer device driver is capable of a single command, multi-packet transfer, then the abstract interface issues the single command and the link layer device driver begins retrieving the plurality of data packets and placing them in data buffers accessible to the target hardware such as a network card or "physical device." The link layer device driver then starts the physical device transferring the data.

Upon the completion of the transfer of multiple packets by the physical device, a transfer response is generated to the link layer device driver which in turn issues a send complete response to the abstract interface. The abstract interface sends a send complete response to the transport driver acknowledging the completion and readiness for additional data packets. Such a transfer of a plurality of data packets in a single command minimizes interrupts to the host computer microprocessor. Each interrupt to the host microprocessor suspends the present processing of the microprocessor to attend to the present interrupt.

Alternative configurations of the present invention provide for the coupling of sophisticated drivers, that is to say drivers having enhanced functionality capable of multi-packet transfers, with less sophisticated drivers where the abstract interface mediates or facilitates the invocation of multi-packet transfer commands by emulating the multi-packet transfer, thus allowing the less sophisticated destination driver to interface with a more sophisticated transport layer driver. For example, the abstract interface upon receiving a multi-packet transfer request, evaluates the sophistication and capability of the designated device driver. If the destination driver is not capable of handling a multi-packet transfer request, individual packet transfer requests can be created by the abstract interface and issued sequentially by the abstract interface to the destination driver. Sophistication or capability information of a driver is loaded into the abstract interface upon loading the driver into the system. Inclusion of sophistication and capability information facilitates the interoperation of older or legacy drivers with more sophisticated or modern drivers as new generations of drivers become available. The present invention also facilitates receiving a plurality of packets from a network and transferring a plurality of packets to a transport layer using a single command.

The abstract interface describes an interface by which one or more device drivers may communicate with one or more transport drivers and the operating system. The abstract interface enables a transport driver to pass network packets or data packets to any one of a plurality of device drivers for transmission to the network via any one of a plurality of physical devices. The abstract interface also facilitates the reception of network packets by a device driver from any one of several underlying physical devices. In summary, the abstract interface defines a fully abstracted environment for facilitating device driver and transport driver development by including common functions such as registration and interception of hardware interrupts into abstract interface functions that may be invoked by the drivers.

Accordingly, it is the primary object of this invention to provide a system and method in a computer operating system for transferring a plurality of data packets between a transport layer and a link layer device driver via an abstract interface.

Another primary object of the invention is to provide a system and method for transferring a plurality of received data packets from a link layer device driver to a transport driver via an abstract interface while minimizing the impact of interruptions to the host system microprocessor that occurs when individual packets are transferred.

Another important object of the present invention is to provide an abstract interface between drivers in a network protocol stack wherein the standardized development interface facilitates ease of portability and driver development. Additionally, many common functions and resource management details of drivers are incorporated into the abstract interface. The abstract interface is also capable of discerning the level of sophistication of interfacing drivers and emulating multiple transfer capabilities for drivers inherently lacking such capability.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and the appended claims, or may be learned by practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not, therefore, to be considered to be limiting of its scope, the invention will be described and explained with additional specificity and detail through the use of the accompanying drawings in which.

DETAILED DESCRIPTION OF THE PREFERRED EMBODIMENTS

The following description of the present invention is presented by using flow diagrams to describe either the structure or the processing of presently preferred embodiments to implement the systems and methods of the present invention. Using the diagrams in this manner to present the invention should not be construed as limiting of its scope. The present invention contemplates both methods and systems for batching or transferring a plurality of data packets between a transport layer and a link layer in a network protocol stack of a computer system. The currently disclosed system, however, can also be used with any special purpose computer or other hardware system and all should be included within its scope.

Embodiments within the scope of the present invention also include computer readable media having executable instructions. Such computer readable media can be any of available media which can be accessed by a general purpose or special purpose computer. By way of example, and not limitation, such program storage means can comprise RAM, ROM, EBPROM, CD-ROM or other optical disk storage, magnetic disk storage or other magnetic storage devices, or any other medium which can be used to store the desired executable instructions and which can be accessed by a general purpose or special purpose computer. Combinations of the above should also be included in the scope of the program storage means. Executable instructions comprise, for example, instructions and data which cause a general purpose computer or special purpose computer to perform a certain function or a group of functions.

Figure 1:
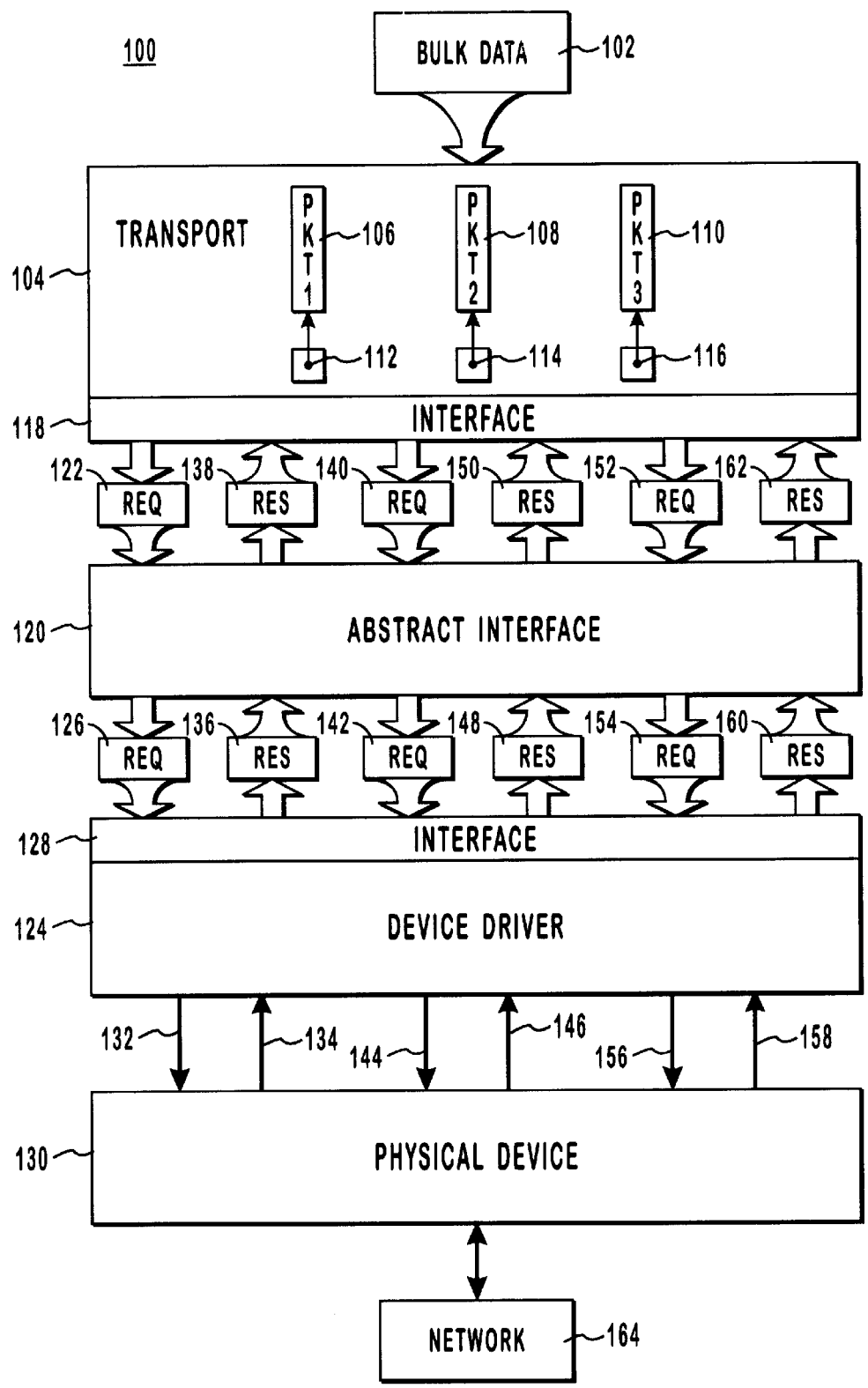
FIG. 1 is a representation of a network protocol stack, in accordance with a prior art configuration.
Figure 2:
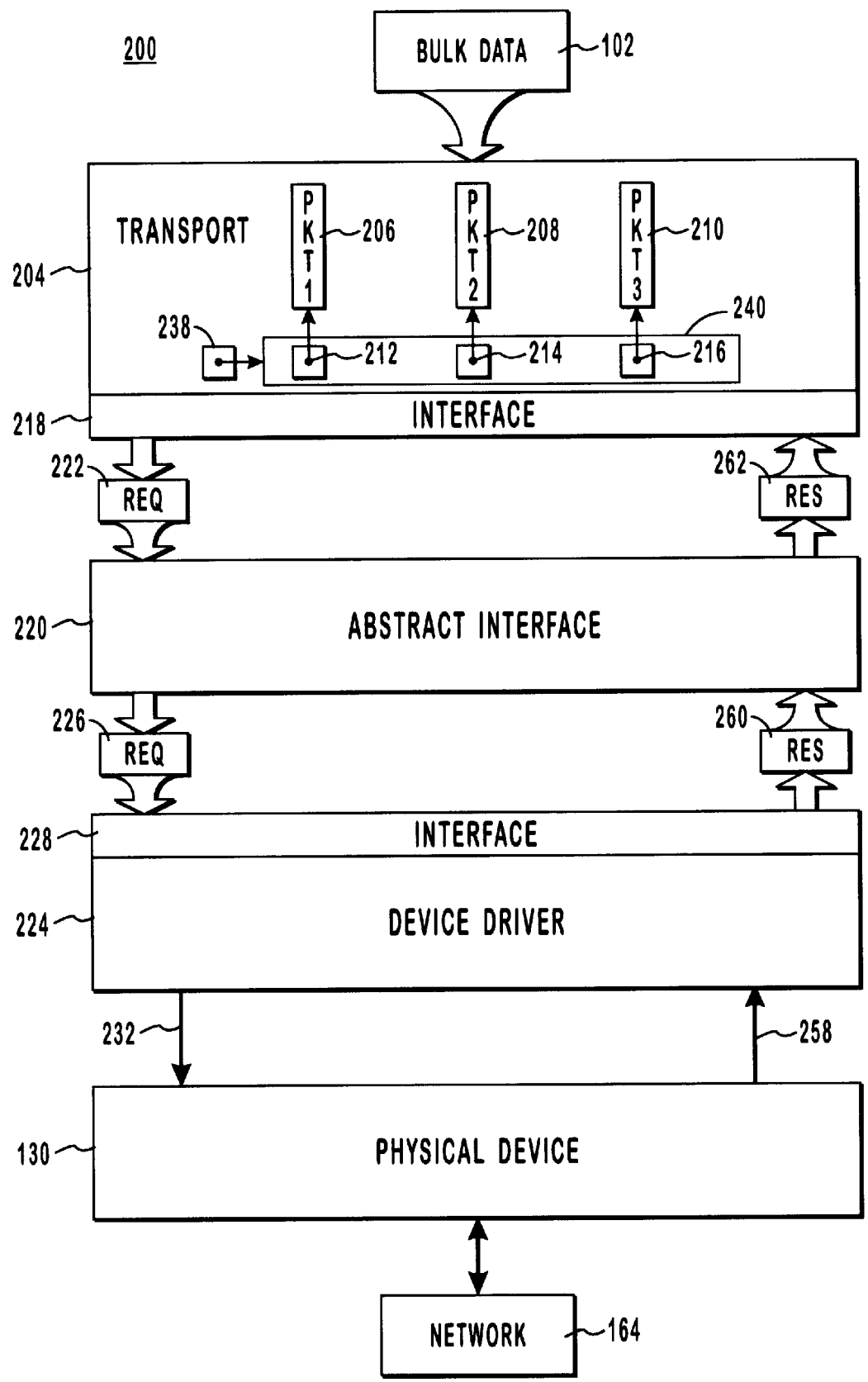
FIG. 2 is a block diagram of a network protocol stack for transferring bulk data between a transport layer and a network, in accordance with one embodiment of the present invention.

FIG. 2 represents a block diagram of a network protocol stack 200 for transferring bulk data 102 to network 164, in accordance with one embodiment of the present invention. A network protocol stack 200 comprised of a transport driver 204 receives bulk data 102 for transfer to a network 164. Transport driver 204, in order to facilitate orderly transfer of data through network 164, must perform packetization and formatting processes on bulk data 102. Transport driver 204 partitions bulk data 102 into data packets 206, 208 and 210. Transport driver 204 is designed to interoperate in an enhanced system wherein an abstract interface 220 mediates or facilitates the transfer of a plurality of packets in a single send packets request 222. Transport driver 204 generates pointers 212, 214 and 216 pointing to data packets 206, 208 and 210, respectively. Pointers 212, 214 and 216 are grouped into a pointer array 240 having an array pointer 238 pointing thereto. Transport driver 204 initiates send packets request 222 to abstract interface 220. Send packets request 222 comprises pointer 238 directed to an array of pointers 240, and in one embodiment, send packets request 222 further comprises a quantity of packets indicator designating the number of packets represented by array pointer 238. Send packets request 222 may additionally be comprised of a handle or indicator designating a specific link layer device driver 224 when a plurality of device drivers are present.

Transport driver 204 adheres to the standardized abstract interface 220 by incorporating an interface 218 as an interface path between transport driver 204 and abstract interface 220. Interface 218 may be calls to Application Program Interface (API) functions in order to access the functionality of abstract interface 220. Interface 218 may also be any other mechanism incorporated into transport driver 204 to access or interface with abstract interface 220. When transport driver 204 issues send packets request 222 to abstract interface 220, transport driver 204 may yield ownership or control of the packet resources, such as buffers, to the device driver.

Abstract interface 220 then evaluates the device driver handle or indicator as specified by transport driver 204 to determine the capabilities of link layer device driver 224. This functionality is described in detail in FIG. 5. If abstract interface 220 determines that link layer device driver 224 facilitates the transfer of multiple packets in a single command, abstract interface 220 issues a send packets request 226 comprising array pointer 238 to packet array 240 and a packet quantity indicator. Send packets request 226 may also be comprised of a device handle or identifier when a plurality of link layer device drivers are present. Upon dispatching send packets request 226, abstract interface 220 awaits the return of an acknowledgment in the form of a packets transfer complete indicator.

Link layer device driver 224 through compliant interface 228 receives send packets request 226 and begins retrieving and copying data packets 206, 208 and 210 as pointed to by packet array 240 into predetermined reserve data buffers accessible to physical device 130. Such reserve data buffers are further discussed in FIG. 6. Upon the completion and transfer of data packets 206, 208 and 210 into the buffers of link layer device driver 224, link layer device driver 224 initiates a transfer request 232 to physical device 130. Such a request may contain additional information such as the quantity of packets to transfer, or may simply be a request to transfer command wherein physical device 130 determines the number of packets present. Physical device 130 then individually transfers data packets 206, 208 and 210 to network 164.

Upon the completion of the transfer by physical device 130, physical device 130 generates a transfer response 258 designating the completed transfer of the packets. Although transfer response 258 is illustrated as a direct communication between physical device 130 and device driver 224, in one embodiment, physical device 130 initiates an interrupt to the microprocessor of the host computer system. The microprocessor then enters an interrupt service routine that performs the requisite processing and notification to link layer device driver 224. Alternatively, the microprocessor or the host computer system may initiate minimal processing in the interrupt service routine and schedule a deferred processing routine for performing the bulk of the interrupt service responsibility at a later time.

Link layer device driver 224, upon receipt of transfer response 258, issues a send complete response 260 to abstract interface 220. Abstract interface 220 subsequently issues a send complete response 262 to transport driver 204 notifying transport driver 204 of the completed transfer of the plurality of packets.

It should be noted that the present embodiment accommodates and facilitates the transfer of a plurality of packets from a transport layer to a link layer and upon the completion of the transfer of the plurality of packets to network 164, a single interrupt is issued to the microprocessor of the host computer system. This is in contrast to prior art systems which create an interrupt for each packet sent. As noted earlier, each interrupt to the host microprocessor suspends the present processing of the microprocessor to attend to the present interrupt. When a substantial amount of bulk data is to be transferred from the transport layer to the network or vise versa, a continuous series of interrupts to the microprocessor significantly degrades the perceived performance of the overall system. The present invention transcends the need for individual acknowledgements in the form of interrupts to the microprocessor for each packet transferred.

Figure 3:
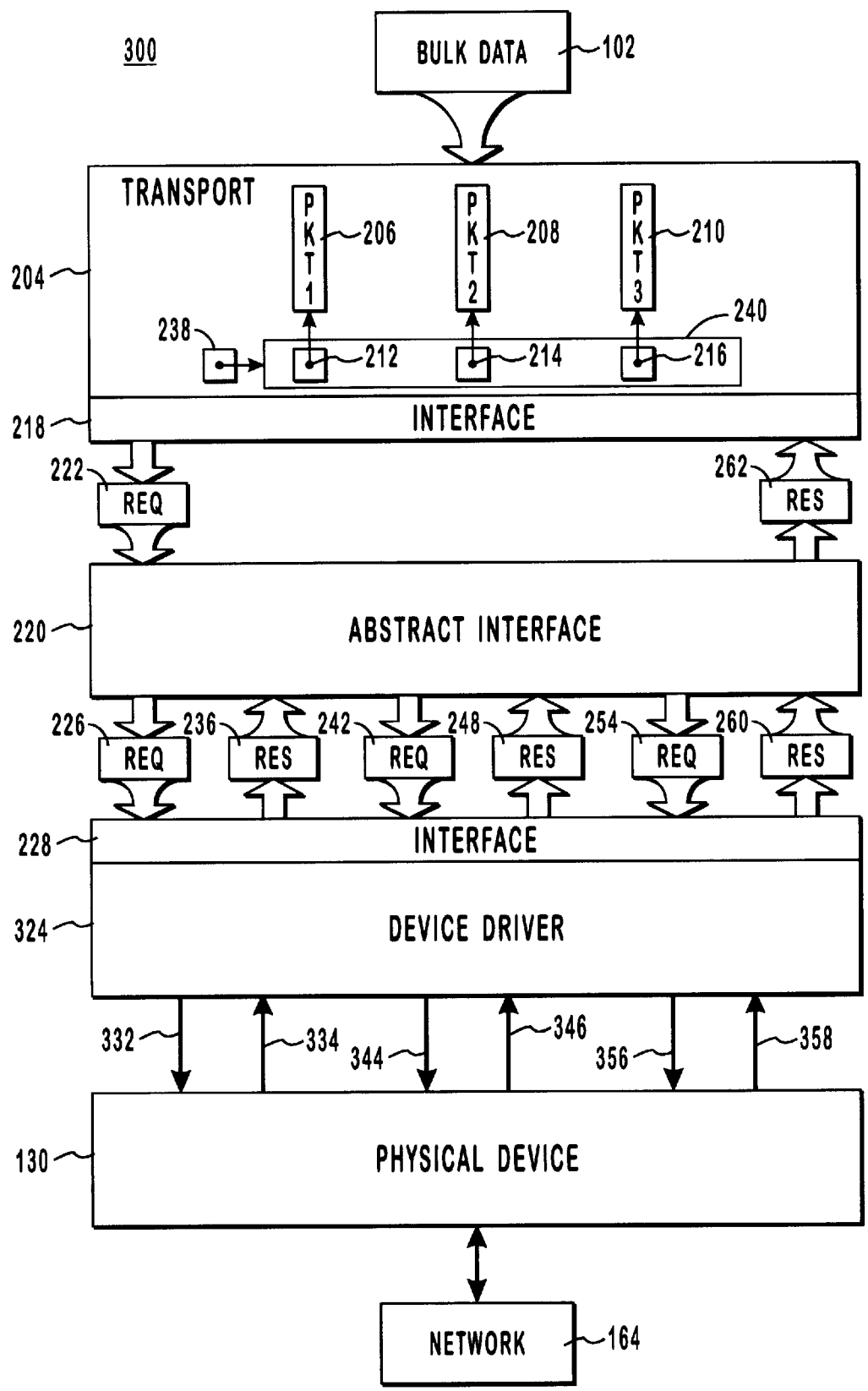
FIG. 3 is a block diagram of a network protocol stack for transferring bulk data between a transport layer and a network, in accordance with another embodiment of the present invention.

FIG. 3 is a block diagram of a network protocol stack for transferring bulk data between a transport layer and a network, in accordance with another embodiment of the present invention. In the present embodiment, processing proceeds within transports driver 204 in accordance with the previous discussion for FIG. 2. That is to say, bulk data 102 is received and packetized into data packets 206, 208 and 210 with pointers 212, 214 and 216 pointing thereto. A pointer 238 denotes a pointer array 240 comprising pointers 212, 214 and 216. Transport driver 204 issues a send packets request 222 comprised of pointer 238 and of a packets quantity indicator. Additionally, as described earlier, a device handle or indicator may also accompany send packets request 222 when a plurality of device drivers 324 is present.

Abstract interface 220, upon receiving send packets request 222, evaluates the capability of the designated link layer device driver 324. Capability information of link layer device driver 324 is incorporated into abstract interface 220 upon the loading or configuration of link layer device driver 324 into the present computer system. By incorporating capability information into abstract interface 220, link layer device drivers and transport drivers having varying capabilities may interoperate due to the mediation capabilities of abstract interface 220 to accommodate or supplement the functionality lacking in less capable or sophisticated drivers. For example, in the present embodiment, transport layer 204 issues send packets request 222 designating link layer device driver 324 as a destination link layer driver and believing it to be capable of transferring multiple packets in response to a single send packets request. However, link layer device driver 324, when loaded into the present host computer system, registered with abstract interface 220 its ability to transfer only single packets using a single command. In the alternative, instead of registering the ability to transfer only single packets, perhaps driver 324 did not register the capability to transfer multiple packets. In such a situation, abstract interface 220 may interpret the failure to identify a specific capability as the lack of that capability.

Abstract interface 220, upon detecting a lower level of capability of link layer device driver 324, emulates the plurality packet transfer function as requested by transport layer 204. In so doing, abstract interface 220 issues a send packet request 226 comprised of pointer 212 to link layer device driver 324. Link layer device driver 324, in the present embodiment, transfers or copies data packet 206 into a predefined transmit buffer accessible by physical device 130 and initiates a transfer request 332 to physical device 130. Physical device 130, upon the completion of the transfer of packet 206 as stored in the predefined buffer to network 164 issues a transfer response 334 designating the completion of the transfer. Although transfer response 334 may take the form of an interrupt to the microprocessor, less processing is required as control reverts locally back to link layer device driver 324 for the initiation of send packet response 236 with no further response passing or traversing up to transport driver 204.

Abstract interface 220 upon receiving send packet response 236 dispatches a send packet request 242 comprised of pointer 214 to link layer device driver 324 whereupon link layer device driver 324 transfers data packet 208 into a predefined transmit buffer with transfer request 344 and transfer response 346 proceeding as did transfer request 332 and transfer response 334. Upon the receipt of send packet response 248, abstract interface 220 initiates a send packet request 254 comprising pointer 216. Link layer device driver 324 copies or transfers data packet 210 to a predefined transmit buffer and initiates transfer request 356 to physical device 130. Physical device 130 upon the completion of the transfer of data packet 210 to network 164 initiates a transfer response 358 to link layer device driver 324. Link layer device driver 324 initiates a send packet response 260 to abstract interface 220. Abstract interface 220 then and only then issues a send packets response 262 to transport driver 204. From the perspective of transport driver 204, the remainder of the protocol stack exhibits the same capability inherent in transport driver 204. This is due, however, to the mediation functionality of abstract interface 220 and its ability upon loading and initialization of drivers, including transport driver 204 and link layer device driver 324, to extract packet transfer capability information of each of the drivers and emulate requested capabilities when destination drivers are less capable. Such emulation capability enables older or legacy drivers to interoperate with more sophisticated or modern drivers as new generations of drivers become available.

Figure 4:
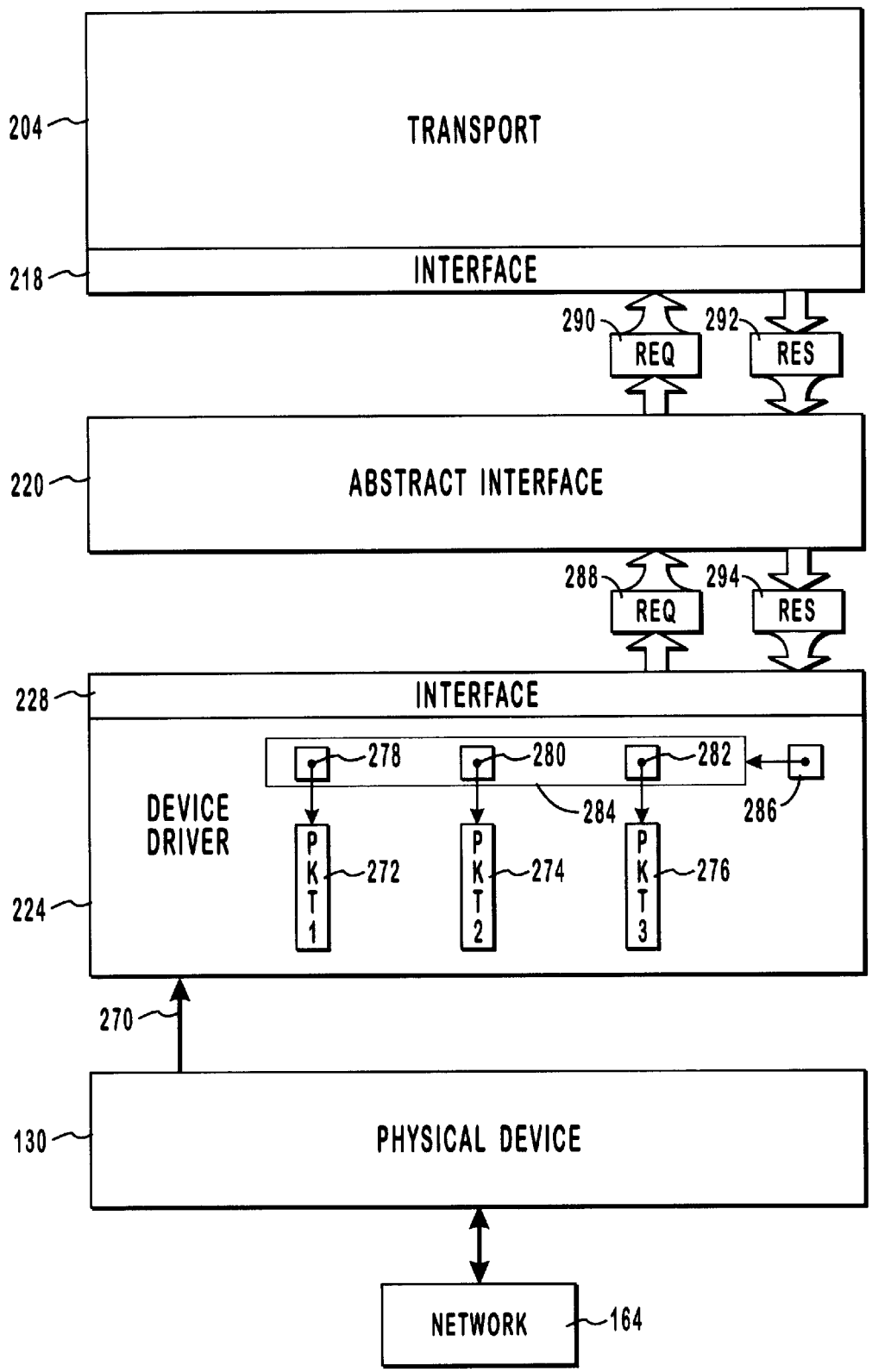
FIG. 4 is a block diagram of a network protocol stack for receiving a plurality of packets from a network for transfer to a transport layer in a network protocol stack in accordance with one embodiment of the present invention.

FIG. 4 represents a block diagram of a network protocol stack capable of receiving a plurality of packets from a network and transferring a plurality of packets to a transport layer by employing a single command, in accordance with an embodiment of the present invention. Physical device 130 monitors network 164, and when presented with a data packet, copies the data packet into predetermined, mutually accessible transfer buffers reserved during the loading or initialization of link layer device driver 224. Upon the completion of the transfer of data packets 272, 274 and 276 into the predetermined transfer buffers, physical device 130 initiates a transfer request 270 which, as discussed above, may take the form of a interrupt to the microprocessor of the host computer. Link layer device driver 224 upon receipt of transfer request 270 generates pointers 278, 280 and 282 and forms a pointer array 284 having a pointer 286. Link layer device driver 224 initiates a receive packets request 288 comprising pointer 286 directed to the array of pointers pointing to the received packets and a quantity of packets indicator denoting the number of packets to be transferred.

Abstract interface 220, upon receiving received packets request 288, evaluates and determines if transport driver 204 maintains the functionality necessary for transferring multiple packets between a link layer and a transport layer by referencing the packet transfer capability indicator of transport driver 204 as registered with abstract interface 220 during loading or initialization of transport driver 204. When abstract interface 220 identifies transport driver 204 as having multiple packet transfer capability, then abstract interface 220 issues a receive packets request 290 comprising pointer 286 and a quantity of packets indicator, and multiple packets may transfer from a single command. If, however, abstract interface 220 determines transport driver 204 lacks the capability to process a multiple packet transfer command, abstract interface 220 emulates the multiple packet transfer process between abstract interface 220 and transport driver 204 by initiating multiple request/response instructions for each of the packets to be transferred. Such an embodiment is not shown in FIG. 4, however, such performance mirrors the interaction as discussed in FIG. 3 between the abstract interface emulating the capabilities that are not inherently present in link layer device driver 324.

Upon the successful completion of the transfer of multiple packets between abstract interface 220 and transport driver 204, transport driver 204 issues a received packets response 292 to abstract interface 220. Upon receipt, abstract interface 220 dispatches a received packets response 294 to link layer device driver 224.

Figure 5:
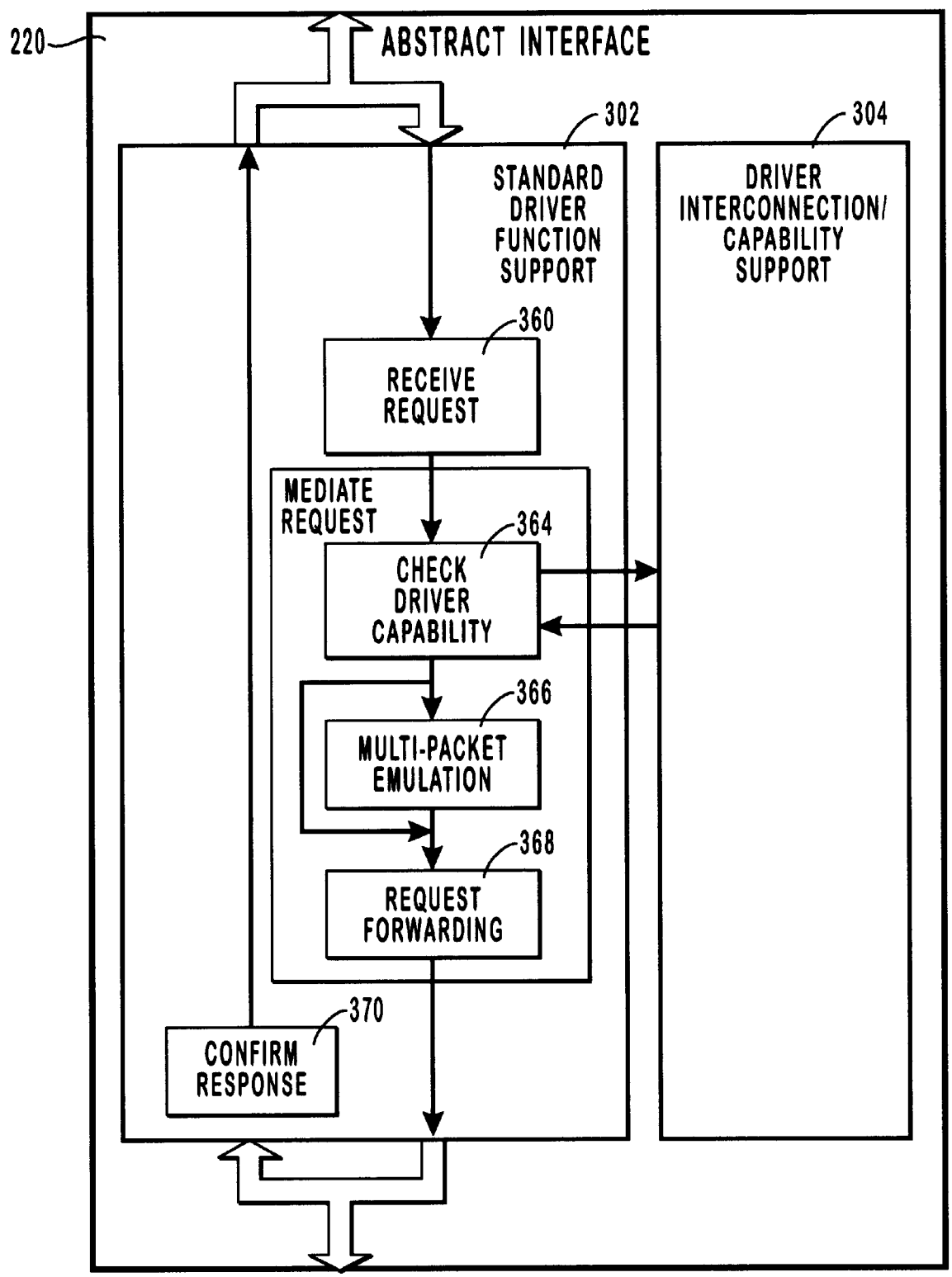
FIG. 5 is a simplified block diagram of an abstract interface for facilitating transfer of a plurality of data packets between a transport layer and a link layer, in accordance with one embodiment of the present invention.

FIG. 5 is a simplified block diagram of an abstract interface 220, in accordance with one embodiment of the present invention. As alluded to above, abstract interface 220 describes the interface by which one or more link layer device drivers may communicate with one or more transport drivers and the operating system. Abstract interface 220 comprises a standard driver function support 302 for facilitating the interfacing of transport and link layer drivers. Since standard driver function support 302 receives requests from transport drivers, embodiments may comprise means for receiving send packet requests. By way of example, in FIG. 5 such means is illustrated by receive request block 360 which, in one embodiment, takes the form of a function call to the library of functions within abstract interface 220. Alternatively, means for receiving send packet requests may take the form of a messaging-based interface providing message evaluation and procedure routing. Since the send plurality of packets request may also be comprised of the location and quantity of data packets requested, means for receiving send packet requests may also include the ability to receive and process pointers and arrays of pointers designating specific locations of the plurality of data packets. Thus, this capability may also be included in receive request block 360.

In embodiments which check the capability of drivers in order to interface drivers which support multiple packet transfer with those that do not, standard driver function support 302 further comprises means for mediating requests between two drivers. As an example, in FIG. 5 such means is illustrated by a mediate request block 362 which evaluates and processes send packets requests. Mediate request block 362 is comprised of means for checking driver capability, as for example check driver capability block 364 which queries and receives a packet transfer capability indicator from a driver interconnection/capability information store 304. The packet transfer capability indicator denotes the extent of inherent support for multiple packet transfers resident within the particular destination driver as described earlier. When multiple packets are to be sent from the transport layer, a device handle may be specified in the request to indicate a link layer device driver, in contrast, when a plurality of packets are to be sent from the link layer device driver to the transport driver, then the device handle will denote a transport driver. When the destination driver possesses multi-packet functionality, then processing passes to a request forwarding means 368 which converts the specified device handle into a call directed to the specified destination driver. However, when the packet transfer capability indicator denotes a lack of support for multi-packet transfer, then a multi-packet emulation means 366 provides emulation of the multi-packet transfers by making iterative calls to the destination device as detailed above in FIG. 3. Standard driver function support 302 further comprises a confirm response a means for confirming responses, as for example block 370 which passes a confirmation or acknowledgment through abstract interface 220 to the request-originating driver upon completion of the transfer of the plurality of data packets.

Abstract interface 220 further comprises a means for facilitating the reception of network data packets by a link layer device driver from any one of several underlying physical devices which are distinguishable by device handles or descriptors. Such means facilitates the passing or transfer of network data packets up to one or more designated transport drivers. Abstract interface 220 further provides the capability for a driver to query abstract interface 200 for determining specific configurations, statistics, and capabilities of device drivers resident within driver interconnection/capability information block 304.

It should be noted that abstract interface 220 may take the form, as in one embodiment, of a function library capable of receiving and processing function calls. Generally, abstract interface 220 defines a fully abstracted environment for facilitating device driver and transport driver development. For example, external functions previously required by transport and device drivers such as registering and interception of hardware interrupts, are off loaded and performed by abstract interface 220 by employing predefined abstract interface functions. Therefore, device drivers may be developed entirely in a platform independent high level language such as C, and then may be easily recompiled to run on any other environment or platform employing abstract interface 220. Such standard driver functional support is comprised within standard driver function support 302.

In one embodiment, abstract interface 220 is implemented as a function library which may be represented as a wrapper surrounding transport and device drivers to facilitate interaction with other operating system components. All interactions between device drivers and transport drivers, device drivers and the operating system, and device driver and physical devices are executed via calls to abstract interface 220. In one embodiment, the function library is packaged in an export library as a set of abstract functions and is incorporated as in-line macros for maximum performance in the host operating system. When transport and device drivers are installed, they link against the function library.

As discussed above, abstract interface 220 provides a fully abstracted specification to which device drivers may be written. Such an interface allows device drivers to be easily ported, in many cases with a simple recompilation, to other abstract interface operating environments. Therefore, device and transport drivers need not know detailed information such as entry points of the other's functions. Instead, each driver registers their functionality and function entry points with abstract interface 220 upon loading. One such example of abstract interface 220 is the Network Driver Interface Specification (NDIS) by Microsoft® incorporated into Windows NT®.

As introduced above, abstract interface 220 is further comprised of driver interconnection/capability information store 304 which is but one example of a means for receiving capability indicators from drivers when they are loaded or installed into the computer system. Such indicators may be stored in a means implemented as a storage table or other data structures capable of being indexed by a device handle. Furthermore, check driver capability block 364 represents an example of a means for evaluating the capabilities of a specific driver by referencing a storage means within driver interconnection/capability information 304 for determining the inherent capabilities of a specific driver such as the extent of support for multi-packet transfers. Such information is compiled into abstract interface 220 upon loading or initialization of the requested driver and referenced thereafter.

Figure 6:
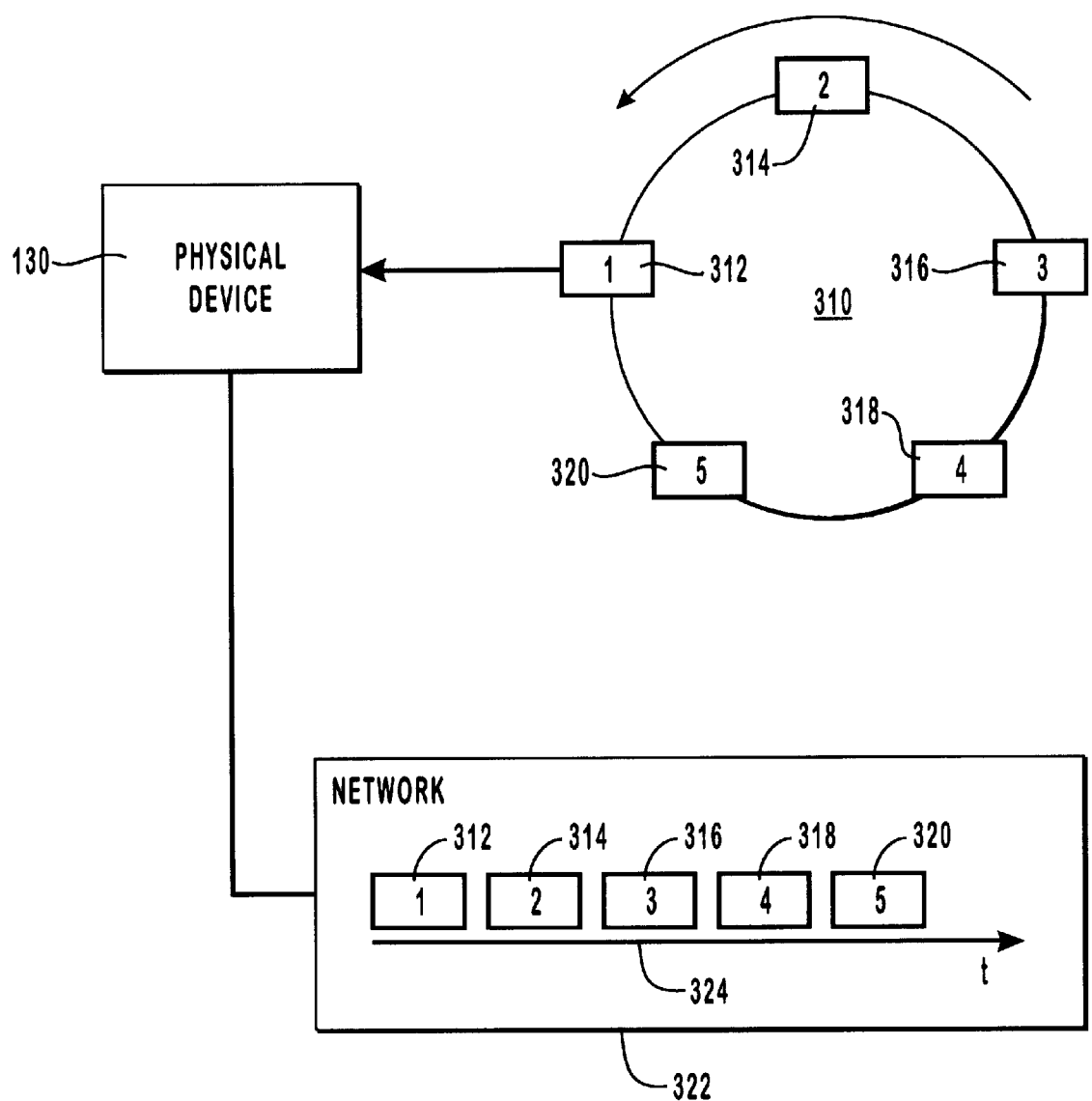
FIG. 6 is a graphical representation of a plurality of data packet buffers for use by a link layer device driver, in accordance with the present invention.

FIG. 6 represents a simplified diagram illustrating the dispatch of a plurality of packets upon a network. As discussed above, a device driver and a physical device exchange data packets between each other by placing the data packets in predetermined data buffers accessible by both entities. When a plurality of buffers are employed, they may be figuratively represented as circular buffers 310. In the present invention, when a plurality of data packets are transferred from a transport layer to a device driver in a single command, they may each populate a buffer within circular buffer 310. When circular buffer 310 is populated, physical device 130 is notified and begins sequentially extracting data packets for dispatch over network 322. A timeline 324 represents a sequential train of data packets 312, 314, 316, 318 and 320. It should be noted that by transferring a plurality of data packets to a device driver, physical device 130 may continuously retrieve and transmit data packets, thus placing them in close proximity with one another over a network. By placing data packets or transmitting data packets in close proximity over a network, the overall throughput of the transfer of bulk data can be improved. That is to say, if data packets are individually transferred from the transport layer to the device driver, the network incurs an inherent latency or spacing of data packets resulting when a device driver notifies a transport layer of the completion and awaits delivery of a subsequent data packet.

In summary, the present invention provides a system and method for transferring a plurality of data packets between a transport layer and a link layer device driver via an abstract interface therebetween. The recipient of destination driver receives a plurality of data packets while an acknowledgment that impacts the performance of the overall system is generated less frequently. In the case of transmitting a plurality of data packets from a transport driver to a link layer device driver, a single acknowledgment suffices for responding to the transfer of several data packets. The present invention also provides a system and method for transferring a plurality of received data packets from a link layer device driver to a transport driver via an abstract interface while minimizing the impact of acknowledgments that occur when individual packets are transferred.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer having an operating system capable of interoperating with a network, a method for transfering a plurality of data packets between a transport layer driver and a link layer device driver via an abstract interface therebetween, wherein said transport layer driver partitions bulk data into data packets in order to facilitate the orderly transfer of data through the network, wherein said link layer device driver interfaces with said network via a physical device and said physical device autonomously receives said plurality of data packets, and wherein the transfer of said plurality of data packets occurs without transmitting an individual send packet request for each data packet thereby reducing undesirable intermittent interruptions in microprocessing, said method comprising:

a specific act of said transport layer driver partitioning said bulk data into a plurality of data packets;

a specific act of said abstract interface receiving from said transport layer driver a single send request to send said plurality of data packets, said single send request comprising a memory location of said plurality of data packets;

in response to said single send request, a step for said abstract interface mediating a transfer of said plurality of data packets to said network via said link layer device driver and said physical device, said step for mediating comprising:

a specific act of said abstract interface receiving from said link layer device driver a packet transfer capability indicator denoting the ability of said link layer device driver to facilitate transfer of multiple packets using said single send request; and a specific act of said abstract interface forwarding said memory location of said plurality of data packets to said link layer device driver; and a specific act of said abstract interface confirming to said transport layer driver completion of said transfer of said plurality of data packets to said network.

2. The method for transferring a plurality of data packets between a transport layer driver and a link layer device driver as recited in claim 1, wherein said specific act of said abstract interface receiving from said transport layer driver a single send request further comprises a specific act of receiving said memory location of said plurality of data packets as a pointer to an array of pointers to said plurality of data packets.

3. The method for transferring a plurality of data packets between a transport layer driver and a link layer device driver as recited in claim 1, wherein the specific act of said abstract interface confirming to said transport layer driver completion of said transfer is conducted in response to a specific act of said physical device issuing an interrupt to said computer upon completion of said transfer.

4. The method for transferring a plurality of data packets between a transport layer driver and a link layer device driver as recited in claim 1, wherein said specific act of confirming further comprises:

a specific act of said abstract interface receiving from said link layer device driver a packet transfer complete indicator; and a specific act of said abstract interface transferring to said transport layer driver said packet transfer complete indicator.

5. The method for transferring a plurality of data packets between a transport layer driver and a link layer device driver as recited in claim 4, wherein said specific act of confirming further comprises a specific act of prior to said specific act of receiving from said link layer device driver a packet transfer complete indicator, a specific act of said abstract interface awaiting arrival of said packet transfer complete indicator while said physical device autonomously retrieves each of said plurality of data packets.

6. In a computer having an operating system capable of interoperating with a network, a method for transferring a plurality of data packets between a transport layer driver and a link layer device driver via an abstract interface therebetween, wherein said transport layer driver partitions bulk data into data packets in order to facilitate the orderly transfer of data through the network, wherein said link layer device driver interfaces with said network via a physical device and said physical device autonomously receives said plurality of data packets, and wherein the transfer of said plurality of data packets occurs without transmitting an individual send packet request for each data packet thereby reducing undesirable intermittent interruptions in microprocessing, said method comprising:

a specific act of said transport layer driver partitioning said bulk data into a plurality of data packets;

a specific act of said abstract interface receiving from said transport layer driver a single send request to send said plurality of data packets, said single send request comprising all information needed by said link layer device driver to access said plurality of data packets;

in response to said single send request, a step for said abstract interface mediating a transfer of said plurality of data packets to said network via said link layer device driver and said physical device; and a specific act of said abstract interface confirming to said transport layer driver completion of said transfer of said plurality of data packets to said network.

7. The method for transferring a plurality of data packets between a transport layer driver and a link layer device driver as recited in claim 6, wherein said specific act of said abstract interface receiving from said transport layer driver a single send request further comprises a specific act of receiving said memory location of said plurality of data packets as a pointer to an array of pointers to said plurality of data packets.

8. The method for transferring a plurality of data packets between a transport layer driver and a link layer device driver as recited in claim 6, wherein said specific act of confirming further comprises:

a specific act of said abstract interface receiving from said link layer device driver a packet transfer complete indicator; and a specific act of said abstract interface transferring to said transport layer driver said packet transfer complete indicator.

9. The method for transferring a plurality of data packets between a transport layer driver and a link layer device driver as recited in claim 6, wherein said single send request comprising a pointer that facilitates said plurality of data packets being accessed from memory, the method further comprising the following:

said abstract interface conveying said pointer to said link layer device driver operably coupled with said physical device;

said link layer device driver transferring said plurality of data packets to link layer driver buffers mutually accessible by said physical device;

said physical device retrieving each of said plurality of data packets from said link layer driver buffers; and said physical device acknowledging to said link layer device driver upon completion of transfer of said plurality of data packets to said network.

10. The method for transferring a plurality of data packets between a transport layer driver and a link layer device driver as recited in claim 6, wherein said specific act of said abstract interface receiving said single send request further comprises the steps of:

additionally receiving a device handle, designating a specific one of a plurality of physical devices; and referencing a driver interconnection information means using said device handle to distinguish said physical device from said plurality of said physical devices.

11. The method for transferring a plurality of data packed between a transport layer driver and a link layer device driver as recited in claim 9, wherein said retrieving step further comprises the step of transmitting each of said plurality of data packets to said network.

12. The method for transferring a plurality of data packets between a transport layer driver and a link layer device driver as recited in claim 11, wherein said retrieving step further comprises the step of said physical device obtaining control of said link layer driver buffers from said computer.

13. The method for transferring a plurality of data packets between a transport layer driver and a link layer device driver as recited in claim 9, wherein said acknowledging step comprises the step of interrupting said computer upon completion of transfer of said plurality of data packets to said network without individually acknowledging transfer of individual ones of said plurality of data packets.

14. A computer-readable medium for use in a computer system capable of interoperating in a network wherein a plurality of data packets are transferred between a transport layer driver and a link layer device driver via an abstract interface therebetween, wherein said transport layer driver partitions bulk data into data packets in order to facilitate the orderly transfer of data through the network, wherein said link layer device driver interfaces with said network via a physical device and said physical device autonomously receives said plurality of data packets, and wherein the transfer of said plurality of data packets occurs without transmitting an individual send packet request for each data packet thereby reducing undesirable intermittent interruptions in microprocessing, said computer system comprising a CPU, said computer-readable medium having computer-executable instructions comprising:

program code means for said transport layer driver to partition said bulk data into a plurality of data packets;

program code means for said abstract interface to receive from said transport layer driver a single send request to send said plurality of data packets, said single send request comprising a memory location of said plurality of data packets;

program code means for said abstract interface, in response to said single send request, to mediate a transfer of said plurality of data packets to said network via said link layer device driver and said physical device, said program code means for said abstract interface to mediate further comprising:

program code means for said abstract interface to receive from said link layer device driver a packet transfer capability indicator denoting the ability of said link layer device driver to facilitate transfer of multiple packets using said single send request; and program code means for said abstract interface to forward said memory location of said plurality of data packets to said link layer device driver; and program code means for said abstract interface to confirm to said transport layer driver completion of said transfer of said plurality of data packets to said network.

15. A computer-readable medium as recited in claim 14 wherein said program code means for said abstract interface to receive from said transport layer driver a single send request further comprises program code means for receiving said memory location of said plurality of data packets as a pointer to an array of pointers to said plurality of data packets.

16. A computer-readable medium as recited in claim 14 wherein said program code means for said abstract interface to confirm further comprise:

program code means for said abstract interface to receive from said link layer device driver a packet transfer complete indicator; and program code means for said abstract interface to transfer to said transport layer driver said packet transfer complete indicator.

17. A computer-readable medium as recited in claim 16 wherein said program code means for said abstract interface to receive from said link layer device driver a packet transfer complete indicator further comprises program code means for said abstract interface awaiting arrival of said packet transfer complete indicator while said physical device autonomously retrieves each of said plurality of data packets.

18. A computer-readable medium for use in a computer system capable of interoperating in a network wherein a plurality of data packets are transferred between a link layer device driver and a transport layer driver via an abstract interface therebetween, wherein the transport layer driver partitions bulk data into data packets in order to facilitate the orderly transfer of data through the network, wherein said link layer device driver interfaces with said network via a physical device and said physical device autonomously receives said plurality of data packets, and wherein the transfer of said plurality of data packets occurs without transmitting an individual send packet request for each data packet thereby reducing undesirable intermittent interruptions in microprocessing, said computer system comprising a CPU, said computer-readable medium having computer-executable instructions comprising:

program code means for said transport layer driver to partition said bulk data into a plurality of data packets;

program code means for said abstract interface to receive from said transport lager driver a single send request to send said plurality of data packets, said single send request comprising all information needed by said link layer device driver to access said plurality of data packets;

program code means for said abstract interface, in response to said single receive request, to mediate a transfer of said plurality of data packets to said network via said link layer device driver and said physical device; and program code means for said abstract interface to confirm to said transport layer driver completion of said transfer of said plurality of data packets to said network.

19. A computer-readable medium as recited in claim 18 wherein said program code means for said abstract layer to receive from said transport layer driver a single send request further comprises program code means for receiving said memory location of said plurality of data packets as a pointer to an array of pointers to said plurality of data packets.

20. In a computer having an operating system capable of interoperating with a network, a method for transferring a plurality of data packets between a transport layer driver and a link layer device driver via an abstract interface therebetween, wherein said transport layer driver partitions bulk data into data packets in order to facilitate the orderly transfer of data through the network, wherein said link layer device driver interfaces with said network via a physical device and said physical device autonomously receives said plurality of data packets, and wherein the transfer of the plurality of data packets occurs without transmitting an individual send packet request for each data packet thereby reducing undesirable intermittent interruptions in microprocessing, said method comprising:

a specific act of said transport layer driver partitioning said bulk data into a plurality of data packets;

a specific act of said abstract interface receiving from said transport layer driver a single send request to send said plurality of data packets, said single send request comprising a memory location of said plurality of data packets;

in response to said single send request, a step for said abstract interface mediating a transfer of said plurality of data packets to said network via said link layer device driver and said physical device, said step for mediating comprising:

a specific act of said abstract interface determining that said link layer device driver lacks the ability to facilitate transfer of multiple packets using said single send request; and a specific act of said abstract interface emulating multiple packet transfer of said plurality of data packets by individually making available each of said plurality of data packets to said link layer device driver; and a specific act of said abstract interface confirming to said transport layer driver completion of said transfer of said plurality of data packets to said network.

21. A computer-readable medium for using a computer system capable of interoperating in a network wherein a plurality of data packets are transferred between a transport layer driver and a link layer device driver via an abstract interface therebetween, wherein said transport layer driver partitions bulk data into data packets in order to facilitate the orderly transfer of data through the network, wherein said link layer device driver interfaces with said network via a physical device and said physical device autonomously receives said plurality of data packets, and wherein the transfer of the plurality of data packets occurs without transmitting an individual send packet request for each data packet thereby reducing undesirable intermittent interruptions in microprocessing, said computer system comprising a CPU, said computer-readable medium having computer-executable instructions comprising:

program code means for said transport layer driver to partition said bulk data into a plurality of data packets;

program code mans for said abstract interface to receive from said transport layer driver a single send request to send said plurality of data packets, said single send request comprising a memory location of said plurality of data packets;

program code means for said abstract interface, in response to said single send request, to mediate a transfer of said plurality of data packets to said network via said link layer device driver and said physical device, said program code means for said abstract interface to mediate comprising:

program code means for said abstract interface to determine that said link layer device driver lacks the ability to facilitate transfer of multiple packets using said single send request; and program code means for said abstract interface to emulate multiple packet transfer of said plurality of data packets by individually making available each of said plurality of data packets to said link layer device driver; and program code means for said abstract interface to confirm to said transport layer driver completion of said transfer of said plurality or data packets to said network.

* * * * *